US008862881B2

(12) United States Patent
Metke et al.

(10) Patent No.: US 8,862,881 B2
(45) Date of Patent: Oct. 14, 2014

(54) METHOD AND SYSTEM FOR MUTUAL AUTHENTICATION OF WIRELESS COMMUNICATION NETWORK NODES

(75) Inventors: Anthony R. Metke, Naperville, IL (US); Donald E. Eastlake, III, Milford, MA (US); Zhi Fu, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 2145 days.

(21) Appl. No.: 11/420,968

(22) Filed: May 30, 2006

(65) Prior Publication Data

US 2007/0283153 A1 Dec. 6, 2007

(51) Int. Cl.
*H04L 29/06* (2006.01)
*H04L 9/32* (2006.01)
*H04W 12/06* (2009.01)

(52) U.S. Cl.
CPC .......... *H04L 63/0869* (2013.01); *H04L 9/3273* (2013.01); *H04W 12/06* (2013.01); *H04L 2209/80* (2013.01)
USPC ........... 713/169; 713/168; 380/270; 380/281; 380/284

(58) Field of Classification Search
CPC .................................................. H04L 63/0869
USPC .................... 713/168, 169; 380/270, 281, 284
See application file for complete search history.

(56) References Cited

U.S. PATENT DOCUMENTS

| 7,174,018 | B1 | 2/2007 | Patil et al. | |
|---|---|---|---|---|
| 7,181,614 | B1 * | 2/2007 | Gehrmann et al. | 713/155 |
| 7,486,651 | B2 * | 2/2009 | Hagiwara et al. | 370/338 |
| 7,561,551 | B2 | 7/2009 | Metke et al. | |
| 2002/0067705 | A1 * | 6/2002 | Orlen et al. | 370/329 |
| 2002/0124169 | A1 * | 9/2002 | Agrawal et al. | 713/168 |
| 2003/0135734 | A1 | 7/2003 | Fagan et al. | |
| 2003/0166397 | A1 * | 9/2003 | Aura | 455/410 |

(Continued)

FOREIGN PATENT DOCUMENTS

| GB | 2453059 A | 3/2007 |
|---|---|---|
| WO | 2007127547 A2 | 11/2007 |
| WO | 2007127547 A3 | 11/2007 |

OTHER PUBLICATIONS

Changhua He, John C. Mitchell, Analysis of the 802.11i 4-Way Handshake, Oct. 1, 2004, Proceedings of the 3rd ACM Workshop on Wireless Security, Philadelphia, PA, USA, pp. 43-50.*

(Continued)

*Primary Examiner* — Bradley Holder
(74) *Attorney, Agent, or Firm* — Randi L. Karpinia; Kenneth A. Haas

(57) ABSTRACT

A method and system for mutually authenticating a first node and a second node operating in a wireless communication network enables mutual authentication when the first node and the second node are unable to directly authenticate each other. The method includes identifying, at the first node, a third node that can authenticate both the first node and the second node (step 215). Authentication data for authenticating the first node with the third node is then transmitted from the first node to the third node (step 220). Keying material that is received from the third node is then processed at the first node (step 225). A shared secret mutual authentication protocol is then processed, whereby the first node and the second node are mutually authenticated by proving that they each have authenticated with the third node and each have the keying material (step 230).

21 Claims, 2 Drawing Sheets

(56) References Cited

U.S. PATENT DOCUMENTS

| | | | |
|---|---|---|---|
| 2003/0226017 | A1 | 12/2003 | Palekar et al. |
| 2004/0225806 | A1 | 11/2004 | Emura et al. |
| 2004/0250076 | A1 | 12/2004 | Kung |
| 2005/0135624 | A1* | 6/2005 | Tsai et al. .................. 380/270 |
| 2005/0188193 | A1 | 8/2005 | Kuehnel et al. |
| 2005/0215234 | A1* | 9/2005 | Fukuzawa et al. ............ 455/411 |
| 2005/0228893 | A1 | 10/2005 | Devarapalli et al. |
| 2005/0278532 | A1* | 12/2005 | Fu et al. ..................... 713/169 |
| 2006/0053290 | A1 | 3/2006 | Randle et al. |
| 2006/0133613 | A1* | 6/2006 | Ando et al. .................. 380/270 |
| 2006/0227725 | A1 | 10/2006 | Huotari et al. |
| 2006/0236377 | A1 | 10/2006 | Metke et al. |
| 2007/0162751 | A1 | 7/2007 | Braskich et al. |
| 2007/0286362 | A1 | 12/2007 | Coleson et al. |
| 2007/0291669 | A1 | 12/2007 | Perkinson |

OTHER PUBLICATIONS

Luo et al.; A lightweight mutual authentication protocol for RFID networks; Published in: e-Business Engineering, 2005. ICEBE 2005. IEEE International Conference on; Date of Conference: Oct. 12-18, 2005 pp. 620-625; IEEE Xplore.*

Needham et al.; Using encryption for authentication in large networks of computers; Published in: Magazine Communications of the ACM CACM Homepage archive; vol. 21 Issue 12, Dec. 1978; pp. 993-999; ACM Digital Library.*

USPTO, Application No. 11380118, Office Action, Non-Final Rejection, Jun. 10, 2008, 16 pages.

PCT/US07/64390, International Search Report and Written Opinion, mailed Jul. 15, 2008, 8 pages.

PCT/US2007/064390, Preliminary Report on Patentability, mailed Nov. 6, 2008, 8 pages.

Chinese Patent Office, Chinese Applicabon No. 200780014692.3, Office Action [translated], Jan. 22, 2010, 3 pages.

Notice of Allowance mailed Feb. 24, 2011 in Chinese Patent Application No. 200780014692.3.

Examination Report mailed May 14, 2010 in Great Britain Application No. GB0820635.1.

Notice of Allowance mailed on Jun. 2, 2009 in U.S. Appl. No. 11/380,118, Anthony R. Metke, filed Apr. 25, 2006.

Notice of Allowance mailed on Feb. 11, 2009 in U.S. Appl. No. 11/380,118, Anthony R. Metke, filed Apr. 25, 2006.

* cited by examiner

METHOD AND SYSTEM FOR MUTUAL AUTHENTICATION OF WIRELESS COMMUNICATION NETWORK NODES

RELATED APPLICATIONS

The present application is related to U.S. Pat. No. 7,561,551, issued Jul. 14, 2009, commonly owned with this application by Motorola, Inc.

FIELD OF THE INVENTION

The present invention relates generally to mutually authenticating wireless network nodes, and in particular to mutually authenticating two network nodes using the assistance of a third network node.

BACKGROUND

Mobile devices such as cellular phones, personal digital assistants (PDAs) and notebook computers often require authentication when accessing remote databases or networks. Devices are generally authenticated through an Infrastructure Access Point (IAP), such as a base station, which is connected to an authentication server. An authentication request can be transmitted for example using an Extensible Authentication Protocol (EAP) comprising EAP Over Local Area Network (EAPOL) packets. The authentication process involves several EAPOL packets being transmitted and received, beginning with an EAP Start packet and finishing with either an EAP Success message packet or an EAP Failure message packet. The authentication server stores the authentication credentials of a mobile device (typically called a supplicant) that is being authenticated. Authentication servers also can be connected to other authentication servers to obtain supplicant authentication credentials that are not stored locally.

In prior systems, a centralized procedure is followed where a single IAP handles an authentication process for all supplicants within range of the IAP. For example, prior systems which adhere to American National Standards Institute/Institute of Electrical and Electronics Engineers (ANSI/IEEE) 802.1X or ANSI/IEEE 802.11i standards utilize such a centralized procedure. Because every supplicant can be authenticated only via an IAP, such a centralized procedure is not practical in wireless communication networks that have nodes operating outside of the wireless range of an IAP.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
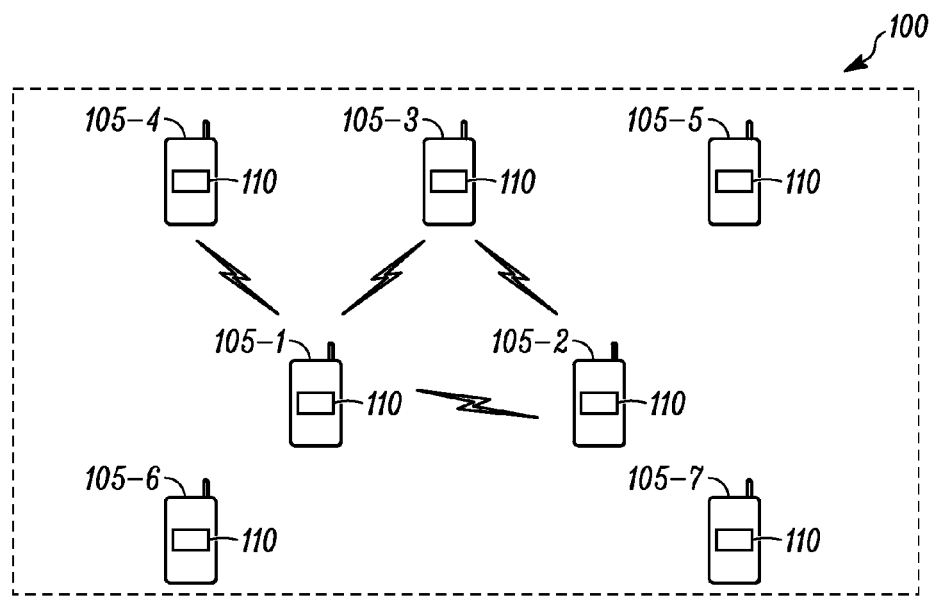
FIG. 1 is a schematic diagram illustrating a wireless communication network, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to mutually authenticating wireless communication network nodes. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of mutually authenticating wireless communication network nodes as described herein. The non-processor circuits may include, but are not limited to, a radio receiver, a radio transmitter, signal drivers, clock circuits, power source circuits, and user input devices. As such, these functions may be interpreted as steps of a method for mutually authenticating wireless communication network nodes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIG. 1, a schematic diagram illustrates an wireless communication network 100, according to some embodiments of the present invention. The network 100 includes a plurality of nodes 105-n (i.e., nodes 105-1 to 105-7) that function as wireless communication devices. According to some embodiments, the network 100 can comprise a Mobile Ad Hoc Network (MANET). MANETs are based on autonomous collections of mobile users who communicate with each other over wireless links having limited bandwidths. MANETs are usually temporary packet radio networks which do not involve significant supporting infrastructure and in which the user nodes themselves perform routing functions. For example, the nodes 105-n can be each associated with a member of a response team that has just arrived at an incident scene. The incident scene may include for example a crime scene, fire scene, accident scene, biological or chemical hazard scene, or another type of emergency or otherwise critical scene. Further, consider that the members of the response team include members from different organizations. For example the first node 105-1 may be associated with a local police officer, and the second node 105-2 may be associated with an ambulance driver from a local hospital. To enable the first node 105-1 and the second node 105-2 to quickly trust each other, they need to complete a secure authentication process. As described in more detail below, each node 105-n therefore comprises mutual authentication computer readable program code components 110.

As known by those skilled in the art, ad hoc wireless networks such as MANETs generally do not include traditional network infrastructure such as base stations, so it can be difficult for ad hoc network nodes to authenticate each other using prior art techniques such as Extensible Authentication Protocol (EAP) Over Local Area Network (EAPOL) packets. However, as described in detail below, the present invention enables two ad hoc wireless network nodes to mutually authenticate using assistance from a third network node that functions as a trust bridge. Use of such a trust bridge can provide a fast and efficient means of mutual authentication.

Consider that the first node 105-1 and the second node 105-2 seek to mutually authenticate. A mutual authentication process can begin with the first node 105-1 and the second node 105-2 exchanging lists of their respective trust anchors. As known by those skilled in the art, a trust anchor is, for example, a public key that a particular node trusts to verify a public key infrastructure (PKI) certificate, where the certificate authenticates the identity of another node. Thus if the first node 105-1 and the second node 105-2 each have one or more trust anchors by which they can authenticate a certificate the other holds, the two nodes 105-1, 105-2 can mutually authenticate by exchanging certificates in messages signed so as to prove they hold the private key corresponding to that certificate.

However, according to embodiments of the present invention, the first node 105-1 and the second node 105-2 can still mutually authenticate, even if one or both does not have a trust anchor by which they can verify a certificate held by the other, if they can identify another node 105-n in the wireless communication network 100 that has at least one trust anchor by which it can authenticate each of the first node 105-1 and the second node 105-2. For example, consider that neither the first node 105-1 and the second node 105-2 has a trust anchor by which it can authenticate the other. The first node 105-1 can then transmit, such as through a network flooding process, a request to a plurality of additional nodes 105-n in the wireless communication network 100. The request asks for assistance from another node 105-n in mutually authenticating the first node 105-1 and the second node 105-2. (According to alternative embodiments of the present invention, such a request for assistance may not be necessary, as network nodes that can provide such assistance may, without solicitation, periodically announce such capabilities to other network nodes.)

Next, consider that a third node 105-3 receives the request for assistance transmitted from the first node 105-1, and the third node 105-3 determines that it has a trust anchor by which it can verify a first certificate held by the first node 105-1 and also has a second trust anchor by which it can verify a second certificate in common with the second node 105-2. The third node 105-3 will therefore transmit a response to the first node 105-1 indicating that the third node 105-3 can assist in mutually authenticating the first node 105-1 and the second node 105-2.

According to embodiments of the present invention, lists of trust anchors and certificates associated with particular nodes 105-n can be disseminated to other nodes 105-n using various techniques. For example, the first node 105-1 and the second node 105-2 can directly exchange lists of trust anchors and certificates immediately after determining that they need to mutually authenticate. The lists of trust anchors and certificates associated with the first and second nodes 105-1, 105-2 then can be transmitted to the third node 105-3 along with the request for assistance in mutually authenticating. Alternatively, nodes 105-n can periodically transmit advertisements throughout the wireless communication network 100. A particular node 105-n can then reference such advertisements when it needs to determine whether a particular trust anchor would enable it to authenticate another node 105-n.

After receiving the response from the third node 105-3, indicating that the third node 105-3 can assist in mutually authenticating the first node 105-1 and the second node 105-2, the first node 105-1 may also receive a similar response from a fourth node 105-4, or even receive similar responses from a plurality of additional nodes 105-n. The first and second nodes 105-1, 105-2 will then need to determine which one of the responding nodes 105-n should be selected to assist in mutually authenticating the first and second nodes 105-1, 105-2. According to embodiments of the present invention, various arbitration processes can be used to make such a determination. For example, the node 105-1 can employ a protocol that selects a responding node 105-n that has the lowest medium access control (MAC) address. As will be appreciated by those skilled in the art, various other arbitration processes also can be used, such as processes that select a responding node 105-n that is closest to the first node 105-1, has the lowest interference, has the best signal to noise (S/N) ratio, or combinations of such processes.

Consider that the first and second nodes 105-1, 105-2 agree that the third node 105-3 should provide assistance in mutually authenticating the first and second nodes 105-1, 105-2. The first node 105-1 will then mutually authenticate with the third node 105-3, and the second node 105-2 will also mutually authenticate with the third node 105-3. Such mutual authentications can be performed according to standard processes known in the art that exchange authentication data, for example by exchanging signed messages comprising International Telecommunication Union (ITU) telecommunication standardization sector (ITU-T) X.509 digital certificates. The third node 105-3 can then securely transmit keying material both to the first node 105-1 and to the second node 105-2. For example such keying material can include a pseudo-random number generated at the third node 105-3. The first and second nodes 105-1, 105-2 will then mutually authenticate by completing a shared secret mutual authentication protocol that proves that each has the keying material that was transmitted from the third node 105-3 and therefore has authenticated with the third node 105-3. For example, such a shared secret mutual authentication protocol could be a four way handshake conforming to an Institute of Electrical and Electronics Engineers (IEEE) 802.11i (WPAv2) standard that specifies security mechanisms for wireless networks. During the four way handshake the keying material thus can function for example as a pair wise master key (PMK) or as a master session key (MSK), as will be understood by those skilled in the art.

According to an alternative embodiment of the present invention, the keying material may not be sent from the third node 105-3 directly to both the first node 105-1 and the second node 105-2. Rather, the third node 105-3 can securely provide a first copy of the keying material to the first node 105-1 and also provide a second copy of the keying material to the first node 105-1, but where the second copy is encrypted so that it can be decrypted only by the second node 105-2. The first node 105-1 can then transmit the second copy of the keying material to the second node 105-2, and the four way handshake then can be performed.

Figure 2:
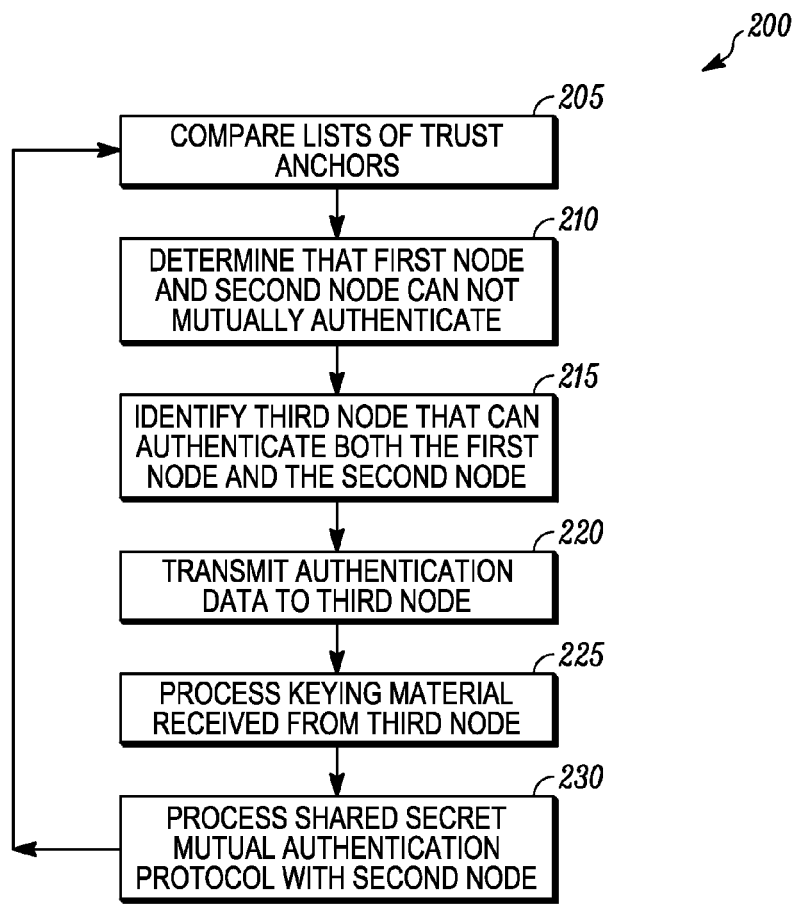
FIG. 2 is a general flow diagram illustrating a method, from the perspective of a first node, for mutually authenticating the first node and a second node that are operating in an ad hoc wireless communication network, according to some embodiments of the present invention.

Referring to FIG. 2, a general flow diagram illustrates a method 200, from the perspective of the first node 105-1, for mutually authenticating the first node 105-1 and the second node 105-2 that are operating in the wireless communication network 100, according to some embodiments of the present invention. At step 205, the first node 105-1 examines a list of trust anchors and certificates associated with the first node 105-1 with a list of trust anchors and certificates associated with the second node 105-2. At step 210, the first node 105-1 determines that the first node 105-1 and the second node 105-2 can not mutually authenticate each other.

At step 215, the first node 105-1 identifies the third node 105-3 as being able to authenticate both the first node 105-1 and the second node 105-2. At step 220, the first node 105-1 then transmits authentication data to the third node 105-3. At step 225, the first node 105-1 then processes keying material received from the third node 105-3. Finally, at step 230, the first node 105-1 processes a shared secret mutual authentication protocol, such as a four way handshake, with the second node 105-2. The first node 105-1 and the second node 105-2 are thus mutually authenticated by proving that they each have the keying material and therefore each has authenticated with the third node 105-3. The method 200 then loops back to step 205, where the first node 105-1 can mutually authenticate with another node 105-n in the network 100. Optionally, the method 200 further can be repeated between still other nodes 105-n until all nodes 105-n in the network 100 are mutually authenticated.

Figure 3:
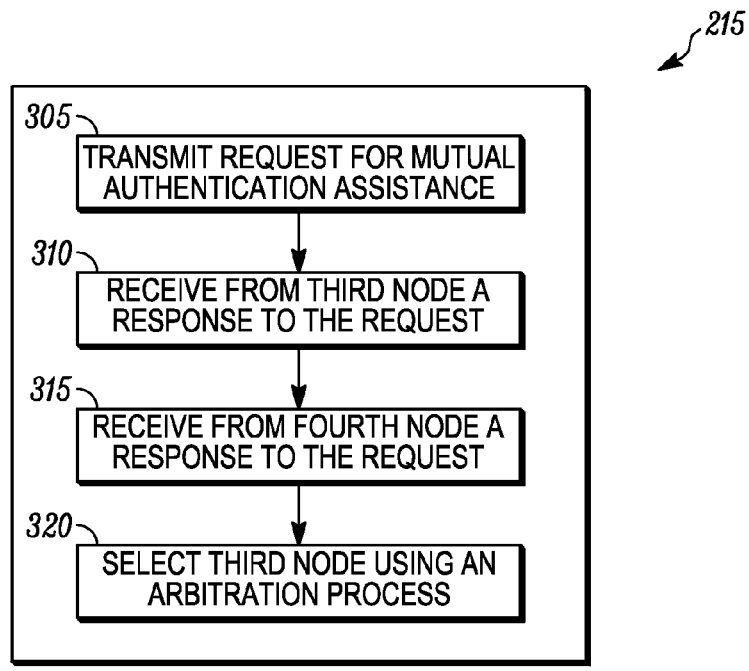
FIG. 3 is a general flow diagram illustrating sub-steps of the method described in FIG. 2, according to some embodiments of the present invention.

Referring to FIG. 3, a general flow diagram illustrates sub-steps of the step 215 concerning identifying the third node 105-3 in the method 200, as described above, according to some embodiments of the present invention. At step 305, the first node 105-1 transmits a request to the third node 105-3 for assistance in mutually authenticating the first node 105-1 and the second node 105-2. At step 310, the first node 105-1 receives a response from the third node 105-3 indicating that the third node 105-3 can assist in mutually authenticating the first node 105-1 and the second node 105-2.

At step 315, the first node 105-1 receives a response from the fourth node 105-4 indicating that the fourth node 105-4 can also assist in mutually authenticating the first node 105-1 and the second node 105-2. Then, at step 320, the first node 105-1 selects the third node 105-3 to provide assistance in mutually authenticating the first node 105-1 and the second node 105-2. As described above, such a selection can be performed according to one of various types of arbitration processes.

Figure 4:
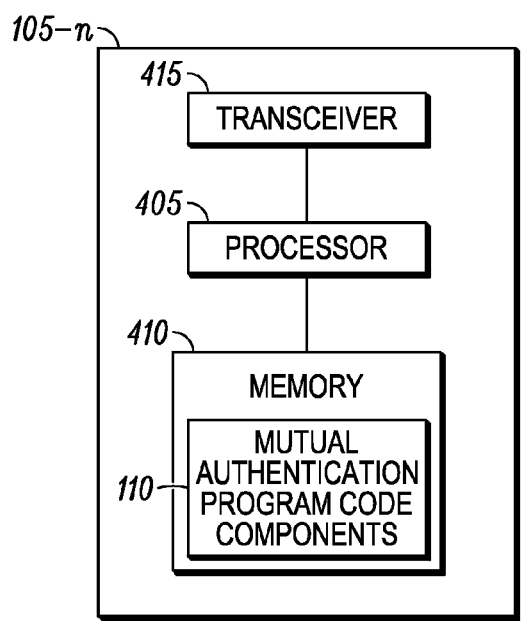
FIG. 4 is a block diagram illustrating components of a node of a wireless communication network, according to some embodiments of the present invention.

Referring to FIG. 4, a schematic diagram illustrates components of a node 105-n of the wireless communication network 100, according to some embodiments of the present invention. Those skilled in the art will recognize that the present invention can be embodied in a system of such a node 105-n, for example in the form of a mobile telephone, notebook computer, two-way radio, personal digital assistant (PDA), or other wireless communication device. A system of a node 105-n can include a processor 405 such as a standard microprocessor or application specific integrated circuit (ASIC) operatively coupled to a memory 410. The memory 410 comprises a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The medium then comprises the mutual authentication computer readable program code components 110 that, when processed by the processor 405, are configured to cause the execution of the above described steps of the method 200. Communications such as those involved in the method 200 are then transmitted from or received by a transceiver 415 that is operatively coupled to the processor 405.

Advantages of the present invention thus include enabling two nodes operating in a wireless communication network to be mutually authenticated, even where the two nodes can not directly authenticate each other. By soliciting assistance from a third node, which can authenticate each of the two nodes that seek to mutually authenticate, the third node can function as a trust bridge and enable the two nodes to mutually authenticate. As described herein, use of such a trust bridge can provide a fast and efficient means of mutual authentication.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for mutually authenticating a first node and a second node operating in a wireless communication network, the method comprising:

determining, by the first node, that the first node and the second node do not have a common trust anchor;

identifying, at the first node, a third node that has a first trust anchor by which it can verify a first certificate held by the first node and also has a second trust anchor by which it can verify a second certificate in common with the second node;

transmitting, in response to identifying the third node, from the first node to the third node, authentication data for authenticating the first node with the third node;

processing, at the first node, a keying material received from the third node;

authenticating the second node and the third node including transmitting from the second node to the third node, authentication data, and transmitting the keying material from the third node to the second node; and processing, at the first node and the second node, a shared secret mutual authentication protocol, whereby the first node and the second node are mutually authenticated in response to each having authenticated with the third node and each having the keying material.

2. The method of claim 1, further comprising:

comparing a list of trust anchors and certificate information associated with the first node and a list of trust anchors and certificate information associated with the second node; and determining that the first node and the second node can not mutually authenticate.

3. The method of claim 2, wherein the list of trust anchors and certificate information associated with the second node is received at the first node from the second node in response to an authentication request.

4. The method of claim 2, wherein the list of trust anchors and certificate information associated with the second node is received at the first node as an advertisement transmitted from the second node.

5. The method of claim 1, wherein the keying material functions as a pair wise master key (PMK) or as a master session key (MSK) between the first node and the second node.

6. The method of claim 1, wherein the shared secret mutual authentication protocol is a four way handshake conforming to an Institute of Electrical and Electronics Engineers (IEEE) 802.11i standard.

7. The method of claim 1, wherein identifying the third node that can authenticate both the first node and the second node comprises:

transmitting a request from the first node to the third node for assistance in mutually authenticating the first node and the second node; and receiving a response from the third node indicating that the third node can assist in mutually authenticating the first node and the second node, because the third node has at least one trust anchor with which the third node can authenticate each of the first node and the second node.

8. The method of claim 7, wherein the request transmitted from the first node to the third node for assistance in mutually authenticating the first node and the second node is also forwarded to a plurality of additional nodes in the network.

9. The method of claim 8, wherein identifying, at the first node, a third node that can authenticate both the first node and the second node comprises:

receiving a response from a fourth node, where the fourth node is included in the plurality of additional nodes in the network, the response indicating that the fourth node can also assist in mutually authenticating the first node and the second node, because the fourth node also has at least one trust anchor with which the fourth node can authenticate each of the first node and the second node; and selecting, using an arbitration process between the first node and the second node, the third node to provide assistance in mutually authenticating the first node and the second node.

10. The method of claim 1, wherein identifying the third node that can authenticate both the first node and the second node comprises receiving an unsolicited announcement from the third node, where the announcement indicates that the third node can authenticate both the first node and the second node.

11. The method of claim 1, further comprising:

exchanging a first trust anchor list from the first node to the second node and a second trust anchor list from the second node to the first node, wherein the determining that the first node and the second node do not have a common trust anchor includes comparing the first trust anchor list with the second trust anchor list.

12. The method of claim 1, further comprising:

transmitting a request for a trust anchor by the first node to all other nodes within the wireless communication network; and receiving a response from the third node indicating that the third node can act as a trust anchor for the first node and the second node.

13. A first node operating to mutually authenticate with a second node within a wireless communication network, the first node comprising:

a hardware processor;

a non-transitory computer readable storage medium for storing:

computer readable program components that when executed by the processor are configured to determine that the first node and the second node do not have a common trust anchor;

computer readable program code components that when executed by the processor are configured to cause, at the first node, identification of a third node that can authenticate the first node and the second node, wherein the third node has a first trust anchor by which it can verify a first certificate held by the first node and also has a second trust anchor by which it can verify a second certificate in common with the second node, and wherein the second node is authenticated with the third node by the second node transmitting authentication data to the third node and the third node provide a keying material to the second node;

computer readable program code components that when executed by the processor are configured to cause transmission, in response to identifying the third node, from the first node to the third node, of authentication data for authenticating the first node with the third node;

computer readable program code components that when executed by the processor are configured to cause processing, at the first node, of keying material received from the third node; and computer readable program code components that when executed by the processor are configured to cause processing, at the first node, of a shared secret mutual authentication protocol with the second node, whereby the first node and the second node are mutually authenticated in response to each having authenticated with the third node and each having the keying material.

14. The first node of claim 13, wherein the non-transitory computer readable storage medium further comprises:

computer readable program code components that when executed by the processor are configured to cause comparison of a list of trust anchors and certificate information associated with the first node and a list of trust anchors and certificate information associated with the second node; and computer readable program code components that when executed by the processor are configured to cause a determination that the first node and the second node can not mutual authenticate each other.

15. The first node of claim 14, wherein the list of trust anchors and certificate information associated with the second node is received at the first node from the second node in response to an authentication request.

16. The first node of claim 14, wherein the list of trust anchors and certificate information associated with the second node is received at the first node as an advertisement transmitted from the second node.

17. The first node of claim 13, wherein the keying material functions as a pair wise master key (PMK) or as a master session key (MSK) between the first node and the second node.

18. The first node of claim 13, wherein the shared secret mutual authentication protocol is a four way handshake conforming to an Institute of Electrical and Electronics Engineers (IEEE) 802.11i standard.

19. The first node of claim 13, wherein the computer readable program code components that when executed by the processor are configured to cause, at the first node, identification of the third node comprise:
   computer readable program code components that when executed by the processor are configured to cause transmission of a request from the first node to the third node for assistance in mutually authenticating the first node and the second node; and
   computer readable program code components that when executed by the processor are configured to cause processing of a response from the third node indicating that the third node can assist in mutually authenticating the first node and the second node, because the third node has at least one trust anchor with which the third node can authenticate each of the first node and the second node.

20. The first node of claim 19, wherein the computer readable program code components that when executed by the processor are configured to cause transmission of the request from the first node to the third node, for assistance in mutually authenticating the first node and the second node, also cause transmission of the request to a plurality of additional nodes in the network.

21. The system of claim 20, wherein the non-transitory computer readable storage medium further comprises:
   computer readable program code components that when executed by the processor are configured to cause processing of a response from a fourth node, where the fourth node is included in the plurality of additional nodes in the network, the response indicating that the fourth node can also assist in mutually authenticating the first node and the second node, because the fourth node also has at least one trust anchor with which the fourth node can authenticate both the first node and the second node; and
   computer readable program code components that when executed by the processor are configured to cause selection, using an arbitration process between the first node and the second node, of the third node to provide assistance in mutually authenticating the first node and the second node.

* * * * *

UNITED STATES PATENT AND TRADEMARK OFFICE
CERTIFICATE OF CORRECTION

| | | |
|---|---|---|
| PATENT NO. | : 8,862,881 B2 | Page 1 of 1 |
| APPLICATION NO. | : 11/420968 | |
| DATED | : October 14, 2014 | |
| INVENTOR(S) | : Anthony R. Metke et al. | |

It is certified that error appears in the above-identified patent and that said Letters Patent is hereby corrected as shown below:

IN THE TITLE PAGE:

On Page 2, Item (56), under "OTHER PUBLICATIONS," in Column 2, Line 11, delete "Applicabon" and insert -- Application --, therefor.

IN THE SPECIFICATION:

In Column 2, Lines 66-67, delete "an wireless" and insert -- a wireless --, therefor.

IN THE CLAIMS:

In Claim 21, Column 10, Line 11, delete "system of" and insert -- first node of --, therefor.

Signed and Sealed this
Fourteenth Day of June, 2016

Michelle K. Lee
*Director of the United States Patent and Trademark Office*